(12) United States Patent
Stevens et al.

(10) Patent No.: US 6,370,016 B1
(45) Date of Patent: Apr. 9, 2002

(54) ELECTROLYTIC CAPACITOR COVER METHOD AND MATERIALS FOR THE MANUFACTURE THEREOF

(75) Inventors: James L. Stevens, Irmo; Roland F. Dapo, Columbia, both of SC (US)

(73) Assignee: BC Components Holdings B.V., Eindhoven (NL)

( * ) Notice: Subject to any disclaimer, the term of this patent is extended or adjusted under 35 U.S.C. 154(b) by 0 days.

(21) Appl. No.: 09/711,826

(22) Filed: Nov. 13, 2000

Related U.S. Application Data

(62) Division of application No. 08/907,128, filed on Aug. 6, 1997, now Pat. No. 6,197,241.

(51) Int. Cl.$^7$ ................................. B65D 51/00

(52) U.S. Cl. .................. 361/519; 361/537; 361/518

(58) Field of Search ................. 361/517–521, 361/536–540

(56) References Cited

U.S. PATENT DOCUMENTS

| | | | | |
|---|---|---|---|---|
| 3,439,231 A | * | 4/1969 | Booe | |
| 3,986,083 A | * | 10/1976 | Carino | |
| 4,039,905 A | * | 8/1977 | Pearce et al. | |
| 4,659,758 A | * | 4/1987 | Landi et al. | |
| 5,091,823 A | * | 2/1992 | Kanbara et al. | |
| 5,149,728 A | * | 9/1992 | Köhler et al. | |
| 5,306,739 A | * | 4/1994 | Lucey | |
| 5,349,496 A | * | 9/1994 | Taniguchi et al. | |

* cited by examiner

*Primary Examiner*—Dean A. Reichard
*Assistant Examiner*—Eric W. Thomas
(74) *Attorney, Agent, or Firm*—Frishauf, Holtz, Goodman, Langer & Chick, P.C.

(57) ABSTRACT

Improved covers for electrolytic capacitors, offering both durability and low extractability of halides by high temperature electrolytes, can be produced from molding compositions comprising thermoset polymers having low halide extractability, preferably based on materials such as phenolic resins, and nonporous fillers, the compositions preferably being essentially free of porous fillers.

14 Claims, No Drawings

ELECTROLYTIC CAPACITOR COVER METHOD AND MATERIALS FOR THE MANUFACTURE THEREOF

This is a division of application Ser. No. 08/907,128 filed Aug. 6, 1997, now U.S. Pat. No. 6,197,241.

BACKGROUND OF THE INVENTION

This invention pertains generally to the field of electrolytic capacitors ("elcaps") and specifically to covers and the construction of covers for capacitors. It is contemplated that the invention will be particularly applicable to aluminum electrolytic capacitors.

Electrolytic capacitors, and specifically aluminum electrolytic capacitors, generate internal heat during operation because of fluctuating. current ("ripple current") and internal resistance (Effective Series Resistance—"ESR") in accordance with the formula: Power (watts)=$I^2_{rs} \times ESR$. The heat is generated internally in the active element of the roll and must diffuse outward to the packaging (or can) before it can be carried away by convection, conduction and/or radiation to the ambient environment. Radial and axial heat flows serve to conduct the heat from the core of the capacitor to the sides and bottom of a cylindrical package in which the capacitor may be encased. Construction details of the capacitor can facilitate or introduce resistance to these heat flows. Excessive internal heat can increase the electrolyte temperature and exacerbate corrosion problems.

The tabs and terminals of elcaps are at special risk of corroding since they are not in contact with the normal working electrolyte, but rather are in contact with the vapors and condensate of that electrolyte. The vapor or condensate is normally less corrosion-resistant because of higher levels of halide (especially chloride) contamination than the normal working electrolyte, preferential volatilization of solvent and less desirable electrolyte components. One likely source of chloride (and other contaminants) is the molded cover (or header or lid) through which electrical connection is made. If the electrolyte vapors and condensate extract any appreciable amounts of halides from the cover, it is mostly likely to migrate under the electric field to the terminals and tabs causing corrosion.

The cover material for aluminum electrolytic capacitors has traditionally been molded from either Nylon® or standard phenolic molding compositions, which contain porous fillers. These materials are satisfactory for use with older, and more corrosion inhibiting, electrolytes at low temperatures (~85° C.), and for lifetimes up to 2,000 hours.

For electrolytic capacitors that are intended to operate at temperatures of greater than 85° C., alternate solvents such as dimethylformamide (DMF) or butyrolactone can be chosen, since they have less tendency to corrode or react with the electrolytic capacitor components at these temperatures (as do the various glycol-based formulations that are commonly used for lower temperature applications). These alternate solvents, however, have undesirable properties such as carcinogenicity, teratogenicity, toxicity, high costs and a tendency to damage the cover, gaskets, etc. It is desirable to use ethylene glycol solvents and solve the corrosive tendencies associated with them for higher temperatures and longer times.

The development of longer life, higher temperature elcaps using environmentally acceptable ethylene glycol has been blocked, at least partly, by the lack of clean, durable elcap covers that are commercially available and inexpensive to manufacture as well as crack and craze. Polymeric molding compositions used in the commercial manufacture of elcap covers comprise thermoplastic or thermosetting resins (such as phenolic resins), fillers and other additives (such as pigments, lubricants and processing aids). Thermoplastics such as Nylon® and polypropylene are flammable and can soften at high temperatures as well as crack and craze. Thermoset materials (such as phenolic resins) are mechanically more stable for long term, high temperature applications. Phenolic resins are typically reaction products of phenols and aldehydes, such as formaldehyde. Fillers can be used up to about 50 volume percent of the molding compositions, and include wood flour, paper, cotton flock, minerals, chopped cloth, fibrous glass, etc. Such fillers can be classified as porous or nonporous.

Phenolic molding compositions can be divided into six general groups, although there is some overlapping. Briefly, these include (1) general-purpose (usually wood flour-filled); (2) impact (filled with cellulose, minerals, glass fibers); (3) nonbleeding (wood flour-filled with carbon black pigment); (4) electrical (mineral-filled with very low water absorption and improved insulation resistance); (5) heat resistant (normally mineral-filled); and (6) special (compounds developed for specific chemical resistance, etc. which may have unique combinations of properties). See "Phenolics," *Modern Plastics Encyclopedia,* Vol. 60, pp. 341–35. (McGraw-Hill, 1983).

Unfortunately, the standard phenolic molding compositions used for the manufacture of elcap covers permit the extraction of corrosion causing halides (principally chlorides) from the inner surfaces of the cover. This halide extraction characteristic of standard covers, especially in combination with the low corrosion inhibition capability of high performance electrolytes, increases the susceptibility of the elcap to corrosion and precludes the construction of reliable, long life elcaps which can be used at higher temperatures.

Other commercially available cover materials, such as Nylon®, prevent to a greater extent the extraction of halides but are flammable, mechanically weak and subject to melting, cracking, crazing and other forms of deterioration. Some expensive specialty polymers exist which may be suitable for the manufacture of elcap covers, but they are not practical for commercial use due to their low availability and/or high cost Accordingly, a clear need exists for improved molding compositions useful for the manufacture of elcap covers that are economical to produce, that can withstand high temperatures (even when used with high performance electrolytes with their lower corrosion inhibiting properties), and that offer long operating life and mechanical strength.

It is an object of the present application to provide a process for producing elcap covers that inhibits or eliminates the extraction of halides, particularly chlorides, from the cover during operation and which process can use commercially available molding compositions. It is also an object of the present invention to provide improved elcap covers which exhibit lower extraction of halides during operation. Further, it is an object of the present invention to provide elcap covers that have low halides extractability characteristics while maintaining suitable mechanical strength, low flammability and long service life. Finally, it is also an object of the invention to provide covers which are suitable for use in electrolytic capacitors at higher temperature and with high performance electrolytes.

These and other objects and advantages will become apparent to those skilled in the art upon a reading of the present disclosure.

SUMMARY OF THE INVENTION

The present invention provides manufacturing methods for the production of electrolytic capacitor covers (from improved molding compositions) that are economical, durable, and exhibit low extractability of corrosion causing halides, while preserving suitable mechanical and electrical properties. The invention also provides improved elcap covers manufactured in accordance with the disclosed methods and with the disclosed molding compositions. The manufacturing technique provided by the present invention requires careful selection of molding resins and nonporous fillers, minimizing porous fillers, in the formulation of the molding compositions for the elcap covers.

The invention will be better understood by reference to the following description taken in conjunction with the appended claims.

DETAILED DESCRIPTION OF THE INVENTION

This section details the preferred embodiments of the subject invention. These embodiments are set forth to illustrate the invention, but are not to be construed as limiting. Since the present disclosure is not a primer on the manufacture of electrolytic capacitor covers, but rather relates to improved construction materials, manufacturing methods, and their selection, basic concepts and standard capacitor features known to those skilled in the art are not set forth in detail. Details for concepts such as choosing appropriate materials, solvents or operating temperatures or manufacturing pressures etc. are known or readily determinable by those skilled in the art. Attention is directed to the appropriate texts and references known to those skilled in the art for details regarding these and other concepts which may be required in the practice of the invention; see, for example, Deeley, *Electrolytic Capacitors* (Cornell-Dubilier Electric Corp., So. Plainfield, N.J.—1938), the disclosure of which is hereby incorporated by reference into the present disclosure to aid in the practice of the invention Covers are generally molded using a suitable polymer resin/binder system in combination with one or more fillers. Usually, manufacturers use porous fillers because of the resulting increased moldability. Wood flour or fiber is a typical example of a porous filler. Injection molding is widely used in the industry for molding both thermoset and thermoplastic resins because it is the simplest, least labor-intensive process. However, conventional phenolic molding compositions may require substantial proportions of porous fillers such as wood flour to be moldable enough for employment with this method For compositions which are less moldable, one may resort to transfer or compression molding methods, although they are generally more labor-intensive.

Unexpectedly, it has been found that moldable, mechanically strong covers could be manufactured from molding materials that do not contain substantial amounts of porous fillers. While not wishing to be bound by any theory, it appears that the type of filler used in the molding composition may affect the porosity or permeability of the molded covers, and thus the tendency of the capacitor electrolyte to extract halides from the material. For example, the wood fiber fillers conventionally used in such phenolic molding compositions are relatively porous, thus allowing the electrolyte to infiltrate the molded product and extract halides from available surfaces of the molded material.

In accordance with the present invention, it was found that combining a thermoset resin, such as a phenolic molding resin having low halide extractability, with a suitable nonporous filler can produce elcap covers having satisfactory properties. While phenolic resins are presently preferred, any thermoset resin which remains moldable when combined with nonporous fillers, e.g. mineral fillers, can be used. For example, amino resins such as melamine and urea resins, thermoset polyimides and polyphenylene sulfides can be used. The molding resin also preferably has low bulk values such as extractable halide and sulfate. Phenolic resins are presently preferred because of their moderate cost, compatibility with glycol and high structural durability. Whatever resin is used, the molding composition (and thus the molded covers) may consist essentially of the resin, although this is not preferred. Since improved physical properties and economy are obtained, molding compositions preferably contain fillers, which can be present up to 90 weight percent. The filled compositions can contain preferably from about 25 to about 75 weight percent resin, and most preferably about from 30 to about 60 weight percent.

Conventional organic, porous fillers such as wood flour are preferably absent, and are replaced by suitable nonporous or mineral fillers which are preferably low in extractable halides to reduce the extractability of halides from the moldings. Small amounts (up to 5 weight percent) of porous fillers may be present, provided the standard for low halide extractability is met. The inventive compositions can contain up to about 90 weight percent of a nonporous filler, including mineral fiber, and preferably contain from about 25 to about 75, and more preferably from about 30 to about 60 weight percent.

Suitable nonporous fillers are typically minerals, including mica, alumina, silica, calcium carbonate, various clays, talc and feldspar. Manufactured materials including glass fibers, glass spheres, solid ceramic spheres formed from fly ash, hollow spheres of sodium silicate or alumina, aramid fibers and hybrid fibers containing aramid and/or carbon can be used as nonporous fillers. Preferably the filler includes a small but effective proportion of a mineral fiber such as wallastonite, wallastakup glass fibers or asbestos, as this improves the physical properties of the moldings. The mineral fibers can constitute 2 to 20 or from about 1 to about 10, preferably from about 2 to about 8, and most preferably from about 3 to about 6 weight percent of the molding composition. The molding compositions can also contain small but effective amounts of pigments, lubricants, processing aids and similar additives known in the art.

Elcap covers manufactured in accordance with the present invention have "low halide extractability," meaning that the molded covers yield less than 1 part per million extracted halide when tested. The moldings are tested by immersion in water at 95° C. for 64 hours, followed by testing of the water by ion chromatography or similar method for the quantity of halide extracted. The extracted halide should be less than 1 ppm, based upon the molding weight. The halide extractability of the molded material is affected by both the halide content and porosity of the filler(s) and the nature of the polymerized resin. The "extraction ratio," the ratio of extracted halide to bulk halide in the molding, indicates the degree to which halides may be extracted from a molded composition under such test conditions. Preferably, the molded covers-have extraction ratios less than about 0.1.

A particularly suitable molding composition is available commercially as Plenco® 06415, a molding powder available from Plenco, Inc., Sheboygan, Wis., which exhibits low halide extractability because of the use of mineral fillers (which are low in halides) and the reduction of porosity in the fillers. The filler is substantially nonporous, i.e. relatively impervious to electrolytes used in electrolytic capacitors, and low in halides, yet retains the property of moldability in the compositions to facilitate the manufacture of the elcap covers. Preferred filler materials for these compositions include blends of minerals with small but effective amounts of mineral fibers, because they have been successfully employed and tested and appear to improve the physical properties of the moldings.

The molded covers of the invention feature low halide extractability, by which it is meant that when immersed in water at 95° C. for 64 hours, less than 1 part per million of halide ion (based upon the molding weight) is extracted The extracted halide can be measured by ion chromatography or any other suitable analytical method.

EXAMPLES

The invention is further illustrated by the following non-limiting examples, which are provided as an aid to understanding the invention and are not to be construed as limiting the invention in any way.

Various molding compositions have been evaluated to determine their suitability for the manufacture of elcap covers. Table I below sets forth minimum properties required of covers for computer grade (screw terminal) applications. One aspect of the invention is to provide covers that meet or exceed the mechanical and electrical properties of the existing covers made from phenolic molding powder while minimizing extractable chloride and gas leaks.

REQUIRED COVER PROPERTIES

| Property | Value | Test Method |
| --- | --- | --- |
| Rate of Burn | <=1.0 in/min | ASTM D635 |
| Dielectric Strength | >=250 V/mil | ASTM D149 |
| Izod Impact | >=0.28 | ASTM D256 |
| Tensile Strength | >=8,000 | ASTM D638 |
| Flexural Strength | >=13,500 | ASTM D790 |
| Modulus in Flexure | >=9.5 × $10^5$ | ASTM D790 |
| Compressive Strength | >=32,600 | ASTM D695 |
| Heat Resistance | >=175 C. for 168 hr | ASTM D794 |
| Deflection Temperature | >=175 C. | ASTM D648 |
| Mold Shrinkage | 0.2–0.4% | JISK 6911 |
| Water Absorption | <=0.1% | ASTM D570 |
| Bulk Chloride | <=30 ppm | X-ray fluoresence analysis vs. standard |
| Extractable Chloride | <0.3 ppm | 318HA 826AI |
| Extractable/Bulk Cl | <=1/100 | Calculated |

To assist in formulating molding compositions which would produce moldings having low halide extractability, various components of typical molding compositions were separately tested for extractable ions by boiling for 15 minutes in water (2 times the volume of the sample), adding water to restore the original volume and analyzing by ion chromatography. The resulting values were corrected for dilution to reflect the parts per million of each ion tested in the sample materials.

The results for the various sample materials tested are presented in Table II:

TABLE II

| Material | Chloride (ppm) | Sulfate (ppm) |
| --- | --- | --- |
| Resin 1[1] | trace | 14 |
| Resin 2[1] | trace | 15 |
| Resin 3[1] | 1.9 | trace |
| "Hexa"[2] (Wright) | 2.2 | 115 |
| "Hexa"[2] (Borden) | 2.4 | 10 |
| Clay | 1.0 | 3.5 |
| Talc | 1.7 | 1.0 |
| Woodflour | 31 | 25 |
| Carbon Black | 4.4 | N.D.[3] |
| Limestone | 18 | 257 |
| Mica | 0.9 | 21 |
| Stearic Acid | trace | trace |
| Wollastakup | 7.4 | 8.8 |
| Wallastonite | 5.5 | 5.3 |

[1]Typical commercial phenolic molding resins.
[2]Hexamethylenetetramine, a one-step resole resin.
[3]None detected.

It was observed that the resin components and most nonporous fillers were low in chlorides, but that woodflour had a relatively high value of 31 ppm. Therefore, the woodflour typically used in molding compositions could contribute to halide extractability from moldings both through its own impurities and by increasing the porosity of the molded material.

Comparative Examples A,B

Phenolic molding compositions were prepared using the following materials:

Material A—Plenco® 06466, a standard mineral-filled phenolic. (64 hrs. $H_2O$ extraction yields 1.6 ppm chloride.)

Material B—[Plenco® 02571 a "standard brown phenolic," containing woodflour or other porous fillers.

After preparing these compositions, composition A was found to be unmoldable by injection molding, apparently because of high viscosity and abrasiveness.

Tests for bulk values and chloride extractibility were carried out on 2-inch discs molded of composition B, but the samples produced unacceptable values for extractable chlorides (10–20 ppm).

The data taken included Extractable Chloride.

The extraction used 2-inch discs in approximately, 2% deionized water in a clean glass bottle with a teflon-lined lid. Each bottle was placed into a 95° C. oven for 64 hours prior to removal and replacement of any lost water (almost negligible). The samples were run on a Dionex ion chromatograph (I.C.) using PAX500 columns and a NaOH gradient regime. Comparison to water based standards calibrated the system.

The bulk chloride data were analyzed by recording the x-ray fluoresence (XRF) intensity at the chloride peak wavelength for both samples and a calibrated organically-bound chloride standard Comparative Examples C and D and Example 1

Sample discs were prepared as described above using molding compositions based upon a standard phenolic material, Plenco #02571 (C), a Nylon® (Vydyne A108), (D) and an improved phenolic, Plenco #06415 (which was specially formulated with minimum porous filler and low bulk chloride materials) (1) in accordance with the present invention. Transfer molding was used for Example 1. The discs were subjected to a 64-hour boil test (in $H_2O$), and the resulting values in ppm chloride ion extracted were:

| Example | Extractable ppm Cl |
|---|---|
| Material C | 10–20 |
| Material D | 0.8–3.0 |
| (1) Inventive Material | 0.1–0.3 |

This demonstrates that objects molded of compositions in accordance with the invention offer lower halide extractiability apparently because of the minimal porous filler content and/or low bulk chloride materials used.

The results of these initial trials are summarized below:

Table of Results. Chloride Extractability

| Examples | Results |
|---|---|
| A | Unmoldable |
| B | Unacceptable (10–20 ppm Cl) |
| C | 10–20 ppm Cl |
| D | 0.8–3.0 ppm Cl |
| I | 0.1–0.3 ppm Cl (inventive) |

Operational Testing

The inventive material of Example 1 was used to produce a number of molded elcap covers by transfer molding. The covers were subjected to tests on electrolytic capacitors using two standard and four experimental electrolytes over voltages of 200 to 450V at temperatures up to 110° C. At 2,000 hours, all the covers exhibited good structural integrity and no corrosion problems attributable to extractable chlorides. The tests were continued to 5,000 hours at 110° C., and the covers had no deformities at this point, in contrast to the extensive deterioration that would be expected with molded Nylon covers.

Examples 2 to 6 and Comparative Examples E to P

Molding compositions were formulated using various phenolic resins and fillers containing various combinations of minerals, mineral fibers and woodflour. The formulations are listed in Table III. Sample discs were molded from the compositions, generally by compression molding for simplicity, and tested for bulk and extractable chlorides in accordance with the procedures described above. The physical properties of the discs were also tested. Simple linear regressions using Lotus 1-2-3™ version 3.1 software, were performed on the contents of resin, organic fiber and mineral fiber for all dependent variables (all variables beyond columns 1–3). Values of $R^2$ of 0.9 or higher were obtained for all dependent variables except extraction ratio, volume resistivity and moldability, indicating a good linear responsible to the variables. Since all the samples produced high values of volume resistivity, this variable was omitted from subsequent analyses.

Moldability is important mainly for maintaining the ability to mold objects using injection molding, in which a screw injector forces hot powder down a long runner system to molds; if an otherwise optimum composition proves to lack this degree of moldability, transfer molding (or even compression molding) can be employed to form the products. It was found that the halide extraction ratio was inversely proportional to the porous filler content. The extraction ratio follows this same relationship when the bulk chloride values are fixed.

In analyses to find optimum and closely acceptable molding composition formulations, the following constraints were placed on the contents and properties of the molded objects. The constraints were:

20≦resin≦40 weight percent
0≦organic fiber≦20 %
5≦mineral fiber≦60%
Military Water Absorption≦0.15
Flexural Modulus>13.5 MPa
Izod Impact>15 J/m
Specific Gravity≦2.2
Mold Shrinkage≧0.002.

The optimum contents determined were about 32 weight percent resin, 0 organic fiber and 5 weight percent mineral fiber, the balance (less than 63%) being other mineral filler. The test formulations also contained small but effective amounts of pigments, lubricants, processing aids, etc. The optimum extraction ratio determined for this composition was 0.019. Based on these results, a preferred molding composition would contain from about 20 to about 40 weight percent phenolic resin and from about 2 to about 20 weight percent mineral fiber, the balance being other non-porous fillers with little or no porous fillers.

From these tests it was confirmed that to minimize halide extractibility in the molded products, porous and/or organic fillers such as woodflour should be minimized or eliminated In some cases, minimal amounts of such porous fillers might be used to improve moldability without increasing halide extractability to an unacceptable degree.

A review of the data of Table III indicates that Examples 2 through 6, all but one employing compositions containing no organic fiber, produce relatively low values of extracted chloride and extraction ratio. Most of the compositions containing 10 percent organic fiber, (Comparative Examples E–J) and all the compositions containing more than 10 percent organic fiber (Comparative Examples K–P), produced unacceptably high values for these parameters.

TABLE III

| Example | Resin wt % | Min. Fiber wt % | Org. Fiber wt % | Bulk Chloride ppm | Extract. Chloride ppm | Extract. Ratio | Flex Strength mPa | Flex Modulus mPa | Flex. Deflection | Izod Impact Strength J/M | Mold Shrink | Mil. H₂O Absorp. wt % | Mold-ability | Comp. Strength psig |
|---|---|---|---|---|---|---|---|---|---|---|---|---|---|---|
| 2 | 40.0 | 31.5 | 0.0 | 9 | 0.50 | 0.056 | 128.6 | 166000 | 2.000 | 21.6 | 0.003 | 9.33 | 2 | 268 |
| 3 | 20.0 | 40.0 | 0.0 | 8 | 0.05 | 0.006 | 60.2 | 15320 | 1.033 | 18.1 | 0.803 | 0.15 | 1 | 135.8 |
| 4 | 30.0 | 10.0 | 0.0 | 4 | 0.05 | 0.013 | 90.2 | 13970 | 1.727 | 18.0 | 0.803 | 0.11 | 7 | 150.8 |
| 5 | 20.0 | 70.0 | 0.0 | 8 | 0.05 | 0.006 | 70.2 | 17980 | 1.054 | 19.3 | 0.003 | 0.12 | 6 | 142.2 |
| 6 | 31.5 | 61.5 | 0.0 | 5 | 0.05 | 0.010 | 137.4 | 20600 | 1.785 | 25.3 | 0.002 | 0.31 | 5 | 285 |
| E | 30.0 | 40.0 | 10.0 | 6 | 2.20 | 0.367 | 92.0 | 12410 | 1.382 | 23.5 | 0.004 | 0.30 | 9 | 163.7 |
| F | 40.0 | 43.0 | 10.0 | 11 | 0.90 | 0.082 | 122.5 | 13660 | 2.480 | 24.7 | 0.803 | 0.28 | 2 | 236 |

TABLE III-continued

| Example | Resin wt % | Min. Fiber wt % | Org. Fiber wt % | Bulk Chloride ppm | Extract. Chloride ppm | Extract. Ratio | Flex Strength mPa | Flex Modulus mPa | Flex. Deflection | Izod Impact Strength J/M | Mold Shrink | Mil. H$_2$O Absorp. wt % | Mold-ability | Comp. Strength psig |
|---|---|---|---|---|---|---|---|---|---|---|---|---|---|---|
| G | 40.0 | 10.0 | 10.0 | 6 | 1.10 | 0.183 | 121.9 | 12460 | 2.626 | 20.4 | 0.004 | 0.26 | 9.5 | 204 |
| H | 30.0 | 40.0 | 10.0 | 13 | 2.40 | 0.185 | 90.7 | 11790 | 2.060 | 17.7 | 0.004 | 0.29 | 9 | 168.5 |
| I | 20.0 | 10.0 | 10.0 | 6 | 5.90 | 0.817 | 2.021 | | | | | | 5 | |
| J | 30.0 | 40.0 | 10.0 | 6 | 2.50 | 0.417 | 83.5 | 11710 | 1.899 | 10.0 | 0.004 | 0.32 | 9 | 167.3 |
| K | 20.0 | 61.5 | 11.5 | 12 | 5.90 | 0.492 | 56.9 | 10790 | 1.393 | 17.6 | 0.005 | 0.40 | 1 | 147.1 |
| L | 25.0 | 29.5 | 18.7 | 11 | 7.20 | 0.655 | 67.6 | 9930 | 1.794 | 17.7 | 0.006 | 0.51 | 1 | 164.5 |
| M | 30.0 | 43.0 | 20.0 | 14 | 7.20 | 0.514 | 75.1 | 9400 | 2.130 | ?8.3 | 0.008 | 0.61 | 8.5 | 174.6 |
| N | 20.0 | 31.5 | 20.0 | | | | | | | | | | | |
| O | 30.0 | 10.0 | 20.0 | 10 | 8.10 | 0.810 | 65.0 | 8920 | 1.923 | 15.6 | 0.008 | 0.66 | 1 | 165.5 |
| P | 40.0 | 21.5 | 20.0 | 11 | 4.00 | 0.364 | 122.3 | 4960 | 3.280 | 19.9 | 0.005 | 0.57 | 10 | 399.5 |

While the present invention has been described in conjunction with specific embodiments, it will be apparent to those skilled in the art that many alternatives, modifications and variations are possible. Accordingly, it is to be understood that the invention is not limited to the specific embodiments hereof but encompasses those alternatives, modifications and variations which fall within the spirit and scope of the appended claims and their equivalents.

What is claimed is:

1. An electrolytic capacitor cover produced by a method comprising
   (a) preparing a molding composition comprising a thermoset resin and a nonporous filler, said nonporous filler being in an amount of 25 to 90 weight percent, said molding composition having a low halide extractability such that less than 1 ppm of halide ion is extracted when said molding composition is immersed in water at 90° C. for 64 hours, and wherein said molding composition has an extraction ratio of extracted halide to bulk halide in the molding composition of less than 0.1, and
   (b) molding said cover from said molding composition.

2. The electrolytic capacitor cover in accordance with claim 1, wherein said resin is a phenolic resin.

3. The electrolytic capacitor cover in accordance with claim 2, wherein the molding composition comprises 20 to 40 weight percent of the phenolic resin and further comprises 2 to 20 weight percent of a mineral fiber, with the balance of the molding composition weight percent being a nonporous filler other than the mineral fiber.

4. The electrolytic capacitor cover in accordance with claim 1, wherein said molding composition further comprises a nonporous mineral fiber, said mineral fiber being in an amount of about 2 to about 20 weight percent based on the weight of said molding composition.

5. The electrolytic capacitor cover in accordance with claim 1, wherein said molding composition is essentially free of porous fillers.

6. The electrolytic capacitor cover in accordance with claim 1, wherein the molding is carried out by injection molding.

7. The electrolytic capacitor cover in accordance with claim 1, wherein the molding is carried out by transfer molding.

8. The electrolytic capacitor cover in accordance with claim 1, wherein the nonporous filler is in an amount of 25 to 75 weight percent.

9. The electrolytic capacitor cover in accordance with claim 1, wherein the molding composition contains 30 to 60 weight percent of the resin.

10. The electrolytic capacitor cover in accordance with claim 9, wherein the nonporous filler is selected from the group consisting of mica, alumina, silica, calcium carbonate, clay, talc, feldspar, glass fiber, glass spheres, solid ceramic spheres formed from fly ash, hollow spheres of sodium silicate, hollow spheres of alumina, aramid fiber and hybrid fibers containing aramid and carbon.

11. The electrolytic capacitor cover in accordance with claim 10, wherein the molding composition further comprises 2 to 8 weight percent of a mineral fiber selected from the group consisting of wallastonite, wallastakup, glass fiber and asbestos.

12. The electrolytic capacitor cover in accordance with claim 1, wherein the nonporous filler is in an amount of 30 to 60 weight percent.

13. A durable cover for an electrolytic capacitor molded from a thermoset molding composition comprising (a) from 20 to about 40 weight percent of a phenolic resin, (b) from about 2 to about 20 weight percent of a mineral fiber, and (c) the balance being a nonporous filler, said molding composition having a low halide extractability such that less than 1 ppm of halide ion is extracted when said molding composition is immersed in water at 95° C. for 64 hours.

14. The cover in accordance with claim 13, wherein said molding composition is essentially free of a porous filler.

* * * * *